(12) United States Patent
Al-Nazr

(10) Patent No.: US 10,260,117 B2
(45) Date of Patent: Apr. 16, 2019

(54) USE OF TOP GAS IN DIRECT REDUCTION PROCESSES

(71) Applicant: SAUDI BASIC INDUSTRIES CORPORATION, Riyadh (SA)

(72) Inventor: Ahmed H. Al-Nazr, Jubail Industrial (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 323 days.

(21) Appl. No.: 14/905,680

(22) PCT Filed: Jul. 22, 2014

(86) PCT No.: PCT/IB2014/002508
§ 371 (c)(1),
(2) Date: Jan. 15, 2016

(87) PCT Pub. No.: WO2015/015317
PCT Pub. Date: Feb. 5, 2015

(65) Prior Publication Data
US 2016/0160304 A1 Jun. 9, 2016

Related U.S. Application Data

(60) Provisional application No. 61/857,182, filed on Jul. 22, 2013.

(51) Int. Cl.
*C21B 13/00* (2006.01)
*C21B 13/14* (2006.01)
*C01B 3/34* (2006.01)

(52) U.S. Cl.
CPC .......... *C21B 13/0073* (2013.01); *C01B 3/348* (2013.01); *C21B 13/14* (2013.01);
(Continued)

(58) Field of Classification Search
CPC ............................. C21B 13/0033; C21B 5/06
See application file for complete search history.

(56) References Cited

U.S. PATENT DOCUMENTS 3,827,879 A 8/1974 Celada et al.
3,904,397 A 9/1975 Celada et al.
(Continued)

FOREIGN PATENT DOCUMENTS

CN 102203298 9/2011
CN 102232119 11/2011
(Continued)

OTHER PUBLICATIONS

U.S. Appl. No. 61/857,182, filed Jul. 22, 2013, Al-Nazr (Saudi Basic Ind. Corp.).
(Continued)

*Primary Examiner* — Scott R Kastler
(74) *Attorney, Agent, or Firm* — Norton Rose Fulbright US LLP

(57) ABSTRACT

In one aspect, the invention relates to a system for producing direct reduced iron wherein a portion of the top gas from a first module for reducing iron oxide by a direct reduction process is utilized as fuel in the thermal equipment of a second module for reducing iron oxide by a direct reduction process, wherein the second module comprises a process gas heating unit. In various aspects, the thermal equipment of the second module is a reducing gas heater and/or a steam boiler. In a further aspect, the top gas from multiple instances of the first module can be utilized collectively as fuel in the thermal equipment of the second module. This abstract is intended as a scanning tool for purposes of searching in the particular art and is not intended to be limiting of the present invention.

15 Claims, 10 Drawing Sheets

(52) U.S. Cl.
CPC ........ *C21B 13/146* (2013.01); *C21B 2100/44* (2017.05); *C21B 2100/60* (2017.05); *C21B 2100/66* (2017.05); *Y02P 10/122* (2015.11); *Y02P 10/126* (2015.11); *Y02P 10/128* (2015.11); *Y02P 10/136* (2015.11)

(56) References Cited

U.S. PATENT DOCUMENTS

| | | | | |
|---|---|---|---|---|
| 4,099,963 | A | 7/1978 | MacKay | |
| 4,375,983 | A | 3/1983 | Celada et al. | |
| 4,880,459 | A | 11/1989 | Coyne | 75/384 |
| 4,955,587 | A | 9/1990 | Sulzbacher et al. | 266/156 |
| 5,435,831 | A | 7/1995 | Meissner | 75/444 |
| 5,439,504 | A | 8/1995 | Czermak et al. | |
| 5,840,097 | A | 11/1998 | Dam | 75/505 |
| 5,855,643 | A | 1/1999 | Cip et al. | 75/380 |
| 5,858,058 | A | 1/1999 | Kern et al. | 75/505 |
| 2006/0027043 | A1 | 2/2006 | Zendejas-Martinez | |
| 2016/0002744 | A1* | 1/2016 | Becerra-Novoa | C21B 13/0033 75/496 |
| 2017/0002434 | A1* | 1/2017 | Grant | C21B 5/06 |

FOREIGN PATENT DOCUMENTS

| | | |
|---|---|---|
| GB | 1428590 A | 3/1976 |
| GC | 2014-27592 | 7/2014 |
| JP | 3441464 B2 | 9/2003 |
| WO | WO-1999/036581 A1 | 7/1999 |
| WO | WO-1999/063119 A1 | 12/1999 |
| WO | WO-01/88207 A1 | 11/2001 |
| WO | WO-2009/084750 A1 | 7/2009 |
| WO | WO-2012/059255 A1 | 5/2012 |
| WO | PCT/IB14/002508 | 7/2014 |
| WO | WO-2015/015317 A2 | 2/2015 |

OTHER PUBLICATIONS

Written Opinion of the International Searching Authority dated May 8, 2015 for application PCT/IB2014/002508, filed on Jul. 22, 2014 and published as WO 2015/015317 on Feb. 2, 2015 (Applicant—Saudi Basic Industries Corporation // Inventor—Al-Nazr) (7 pages).
International Search Report issued by the International Searching Authority dated May 8, 2015 for application PCT/IB2014/002508, filed on Jul. 22, 2014 and published as WO 2015/015317 on Feb. 2, 2015 (Applicant—Saudi Basic Industries Corporation // Inventor—Al-Nazr) (4 pages).

\* cited by examiner (A)
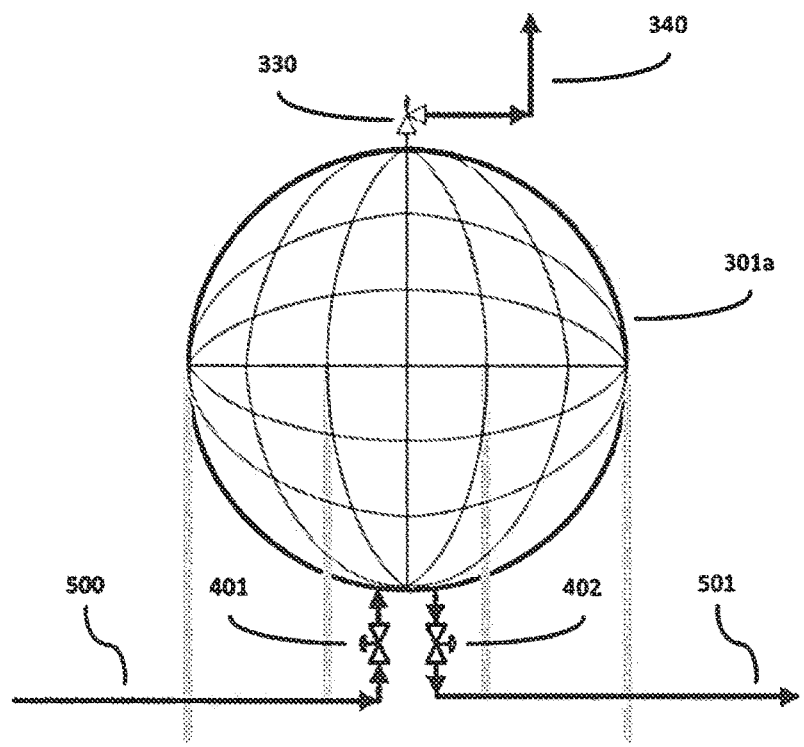
(B)
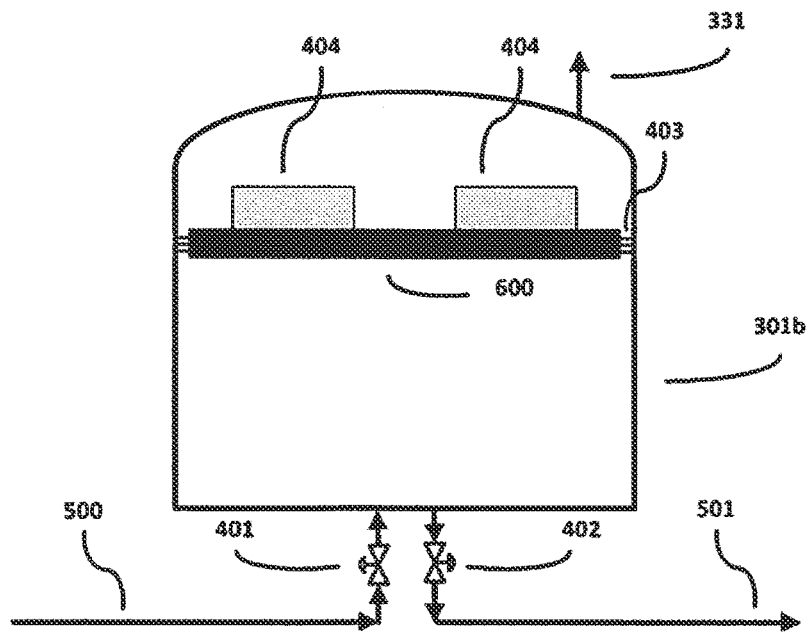
Figure 7

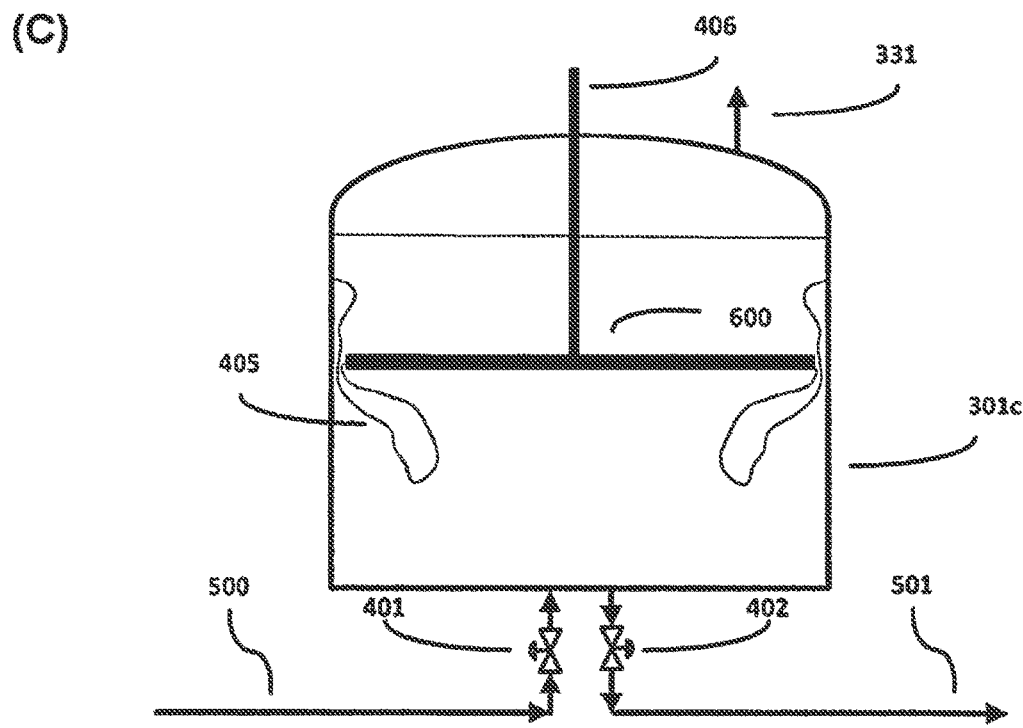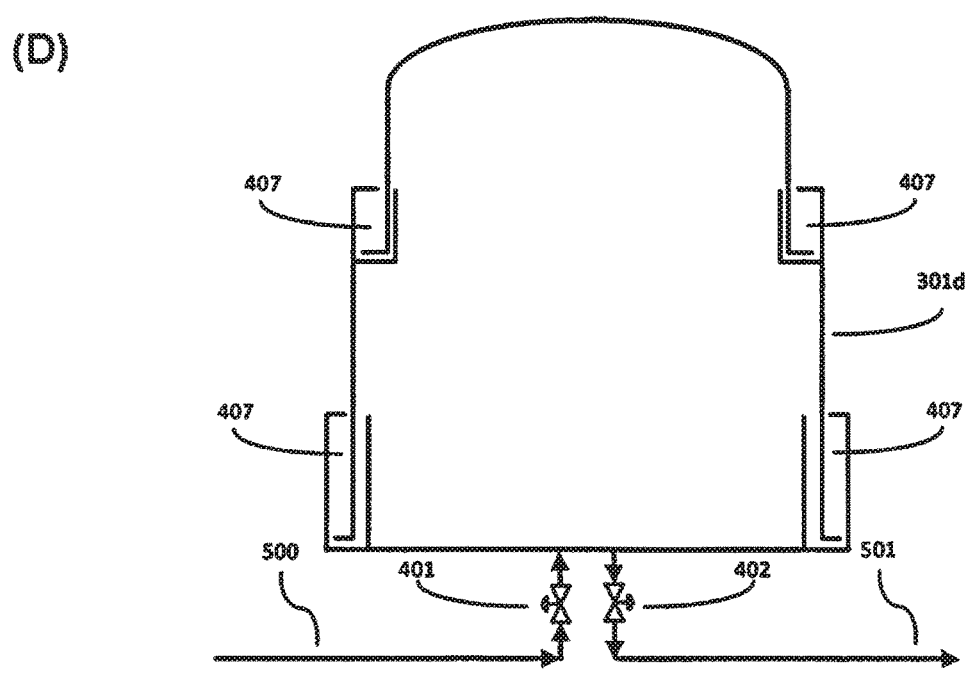
Figure 7 (continued)

USE OF TOP GAS IN DIRECT REDUCTION PROCESSES

CROSS-REFERENCE TO RELATED APPLICATIONS

This Application is a U.S. National Phase Application of International Application No. PCT/IB2014/002508, filed Jul. 22, 2014, which claims the benefit of U.S. Provisional Application No. 61/857,182, filed Jul. 22, 2013, which are both incorporated herein by reference in their entirety.

BACKGROUND

The production of metallic iron from iron ore or iron oxide can be accomplished by a variety of systems and processes. The direct reduction of iron oxide by contacting the iron oxide directly with reductant in a process known as direct reduction of iron is widely used in the industry. Direct reduction ("DR") processes produce metals from their ores or oxides by removing associated oxygen from ores at temperatures below the melting temperature of any of the materials involved in the processes. The product obtained as a result of a direct reduction process is known as direct reduced iron ("DRI"), and is a highly metallized iron product.

Although there are many advantages to the use of DR processes for the production of metallized iron, the processes consume significant amounts of fuel, e.g. coal, natural gas, methane, or syngas, both as a source of the reducing gas and a fuel source for thermal equipment. Moreover, a significant amount of the fuel utilized is ultimately flared, with the relative amount of fuel flared dependent upon several factors, including: in part to control operating pressure of the reducing gas in DR system, production rates, and the quality of input natural gas. Flaring of fuel is not only economically inefficient, but also is environmentally undesirable as it represents a source of greenhouse gas.

Despite advances in DR production systems and processes, there remain significant inefficiencies in the use of fuel in currently available technologies. These needs and other needs are satisfied by the present invention.

SUMMARY

In accordance with the purpose(s) of the invention, as embodied and broadly described herein, the invention, in one aspect, relates to a system for producing direct reduced iron wherein a portion of the top gas from a first module for reducing iron oxide by a direct reduction process is utilized as fuel in the thermal equipment of a second module for reducing iron oxide by a direct reduction process, wherein the second module comprises a process gas heating unit.

In one aspect, disclosed are iron oxide-reducing systems comprising: (a) a first module for reducing iron oxide by direct reduction process, the first module comprising a first reducing gas inlet, a first reducing reactor, and a top gas outlet; wherein the first module, during operation, produces metallic iron and expels a top gas stream via the top gas outlet; and (b) a second module for reducing iron oxide by direct reduction process, the second module comprising a second reducing gas inlet, a second reducing reactor, a reducing gas heater, and a steam boiler; wherein the second module, during operation, produces metallic iron; wherein the second module produces metallic iron during operation; wherein the second module comprises a process gas heating unit; and wherein the second module is configured to receive the top gas stream from the first module as a heat-generation gas for the thermal equipment of the second module.

In a further aspect, the invention relates to iron oxide-reducing systems comprising: (a) a first module for reducing iron oxide by direct reduction process, the first module comprising a first reducing gas inlet, a first reducing reactor, and a top gas outlet, wherein the first module, during operation, produces metallic iron and expels a top gas stream via the top gas outlet; (b) a second module for reducing iron oxide by direct reduction process, the second module comprising a second reducing gas inlet, a second reducing reactor, a reducing gas heater, and a steam boiler; wherein the second module, during operation, produces metallic iron; wherein the second module comprises a process gas heating unit; and wherein the second module is configured to receive the top gas stream from the top gas holding module as a heat-generation gas for the thermal equipment of the second module; and (c) a top gas holding module for storing the top gas from the first module, the top gas holding module comprising a gas holder tank receiving the top gas flow path, a top gas flow path from the gas holder tank, a compressor operating on the top gas flow path from the gas holder tank, and a top gas flow from the top gas holder tank to a flare stack; wherein the top gas holding module is configured to receive the top gas stream from the first module.

In a further aspect, the invention relates to a process reducing iron oxide, the process comprising the steps of: (a) producing a top gas with a first module for reducing iron oxide by direct reduction process, the first module comprising a first reducing gas inlet, a first reducing reactor, and a top gas outlet; wherein the first module, during operation, produces metallic iron and expels the top gas via the top gas outlet; (b) conveying the top gas from the first module for reducing iron oxide; (c) receiving the top gas into a second module for reducing iron oxide by direct reduction process, the second module comprising a second reducing gas inlet, a second reducing reactor, a reducing gas heater, and a steam boiler; wherein the second module, during operation, produces metallic iron; and wherein the second module comprises a process gas heating unit; and (d) combusting the top gas to generate heat in the thermal equipment of the second module.

In a further aspect, the invention relates to a process for reducing iron oxide, the process comprising the steps of: (a) producing a top gas with a first module for reducing iron oxide by direct reduction process, the first module comprising a first reducing gas inlet, a first reducing reactor, and a top gas outlet; wherein the first module, during operation, produces metallic iron and expels the top gas via the top gas outlet; (b) conveying the top gas from the top gas outlet to a top gas scrubber; (c) dividing the top gas exiting the top gas scrubber into multiple top gas flow paths; (d) conveying one of the multiple top gas flow paths to a gas holder tank; (e) conveying top gas from the top gas holder tank to a knock-out drum; (f) conveying top gas from the knock-out drum to at least one particulate filter; (g) dividing the top gas into a recirculation flow path and a second module top gas flow path; (h) conveying the recirculation flow path to a gas cooler, and then conveying the cooled gas to the gas holder tank; (i) conveying the second module top gas flow path to the second module for reducing iron oxide; (j) receiving the top gas into a second module for reducing iron oxide by direct reduction process, the second module comprising a second reducing gas inlet, a second reducing reactor, a reducing gas heater, and a steam boiler; wherein the second module, during operation, produces metallic iron; and wherein the second module comprises a process gas heating unit; and (k) combusting the top gas to generate heat in the thermal equipment of the second module.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the invention.

FIG. 7 shows examples of export storage gas tanks that can be used in an export gas storage module, e.g. export gas storage modules 3*a*, 3*b*, or 3*c*, of the present invention; the storage tanks are: (A) spherical gas storage tank, 301*a*; (B) piston type gas holder tank, 301*b*; (C) an alternative piston type gas holder tank, 301*c*; and (A) floating roof type gas holder tank, 301*d*.

Figure 1:
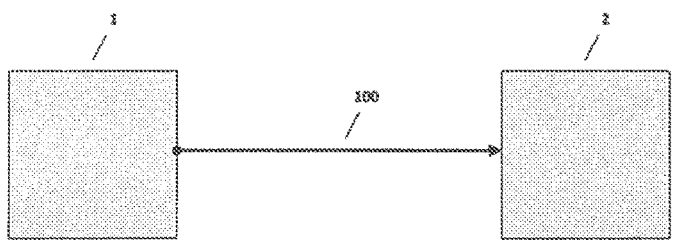
FIG. 1 shows a flow diagram for an iron oxide reducing system with a first iron reducing module, 1, and a second iron reducing module, 2, with the second iron reducing module configured to receive top gas, 100, from the first iron reducing module.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

A. Definitions

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

A mole percent (mol %) of a component, unless specifically stated to the contrary, is based on the total number of moles of the formulation or composition in which the component is included.

As used herein, the terms "optional" or "optionally" means that the subsequently described event or circumstance can or cannot occur, and that the description includes instances where said event or circumstance occurs and instances where it does not.

As used herein, "direct reduction process" and "DR process," can be used interchangeably, means a process to remove oxygen from iron ore or iron oxide which occurs without melting the iron ore or iron oxide. The oxide feed in the DR process, whether iron ore or iron oxide, can be granular or fines. If granular feed, the oxide feed is in the form of pellets produced typically in a pelletizing plant from iron ore fines, or the feed is in the form of lump iron ore. The granular oxide feed is typically greater than about 6-8 mm in size. If fines feed, the oxide feed is iron ore fines typically under 6 mm in size, although 12 mm fines are also used. Such fines may be naturally occurring or they may have been concentrated to improve quality. The reductant used in the DR process is most typically a gas, e.g. natural gas or other gaseous stream that can be reformed or cracked to produce $H_2$, or CO to be used in the reduction of the oxide. High methane containing natural gas is the most common form, although gas that is a byproduct of other processes is also used. In some DR processes, the reductant is a solid that is in lump form or finely ground. The two most predominant DR processes in commercial use are the Midrex® direct reduction process and the HYL® direct reduction process.

As used herein, "direct reduction iron" and "DRI," can be used interchangeably, refers to the product of a direct reduction process. These terms can also be used interchangeably with the term "sponge iron." Sponge iron, which is still in agglomerate form, normally is densified following the DR process by briquetting. In general production, it is melted to extract the reduced elemental iron from contaminants such as silica and sulfur, which are tightly bound to the elemental iron in the sponge iron product.

As used herein, "module" and "plant," can be used interchangeably, and means a discrete production or process facility, e.g. a plant utilizing a Midrex® direct reduction process. Alternatively, the discrete production or process facility can be equipment comprising a storage or containment facility, e.g. the top gas holding module of the present invention. As used herein, a module can accept inputs from another module.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

B. Systems and Processes for Integration of DR Modules

In one aspect, the invention relates to relates to a system for producing direct reduced iron wherein a portion of the top gas from a first module for reducing iron oxide by a direct reduction process is utilized as fuel in the thermal equipment of a second module for reducing iron oxide by a direct reduction process, wherein the second module comprises a process gas heating unit.

Figure 2:
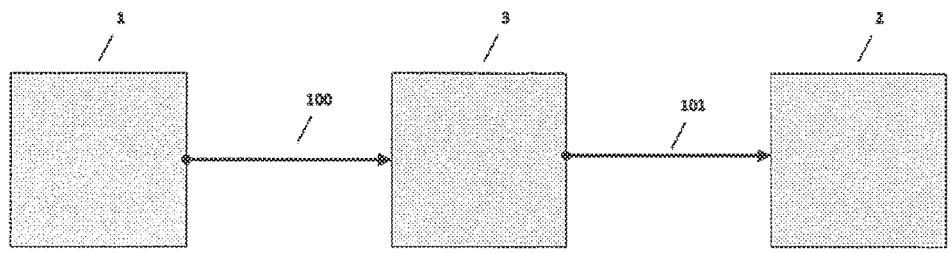
FIG. 2 shows a flow diagram for an iron oxide reducing system with a first iron reducing module, 1, a second iron reducing module, 2, and an export gas storage module, 3, which is configured to receive top gas, 100, from the first iron reducing module and the second iron reducing module is configured to receive top gas from the export gas storage module.

In various aspects, the invention relates to a system schematically shown in FIG. 2, wherein at least a portion of the top gas stream from a first module, 1, is integrated as export top gas stream, 100, to the second module, 2. The first module, 1, is capable of reducing iron oxide by a direct reduction process and comprises a first reducing gas inlet, a first reducing reactor, and a top gas outlet; wherein the first module, during operation, produces metallic iron and expels a top gas via the top gas outlet. The second module, 2, is capable of reducing iron oxide by a direct reduction process and comprises a second reducing gas inlet, a second reducing reactor, a reducing gas heater, and a steam boiler, wherein the second module, during operation, produces metallic iron; wherein the second module comprises a process gas heating unit, during operation, produces metallic iron, and wherein the second module is configured to receive the top gas from the first module as a heat-generation gas for the thermal equipment of the second module.

In various aspects, the invention relates to a system schematically shown in FIG. 2, wherein at least a portion of the top gas from a first module, 1, is integrated as an export top gas stream, 100, to a top gas holding module, 3, and top gas from the top gas holding module is conveyed, 101, to a second module, 2. The first module, 1, is capable of reducing iron oxide by a direct reduction process and comprises a first reducing gas inlet, a first reducing reactor, and a top gas outlet; wherein the first module, during operation, produces metallic iron and expels a top gas via the top gas outlet. The second module, 2, is capable of reducing iron oxide by a direct reduction process and comprises a second reducing gas inlet, a second reducing reactor, a reducing gas heater, and a steam boiler, wherein the second module, during operation, produces metallic iron; wherein the second module, during operation, produces metallic iron and operates at a pressure of at least about 5 bar, and wherein the second module is configured to receive the top gas from the first module as a heat-generation gas for the thermal equipment of the second module. The top gas holding module, 3, comprises a gas holder tank receiving the top gas flow path, a top gas flow path from the gas holder tank, a compressor operating on the top gas flow path from the gas holder tank, and a top gas flow from the top gas holder tank to a flare stack.

Figure 3:
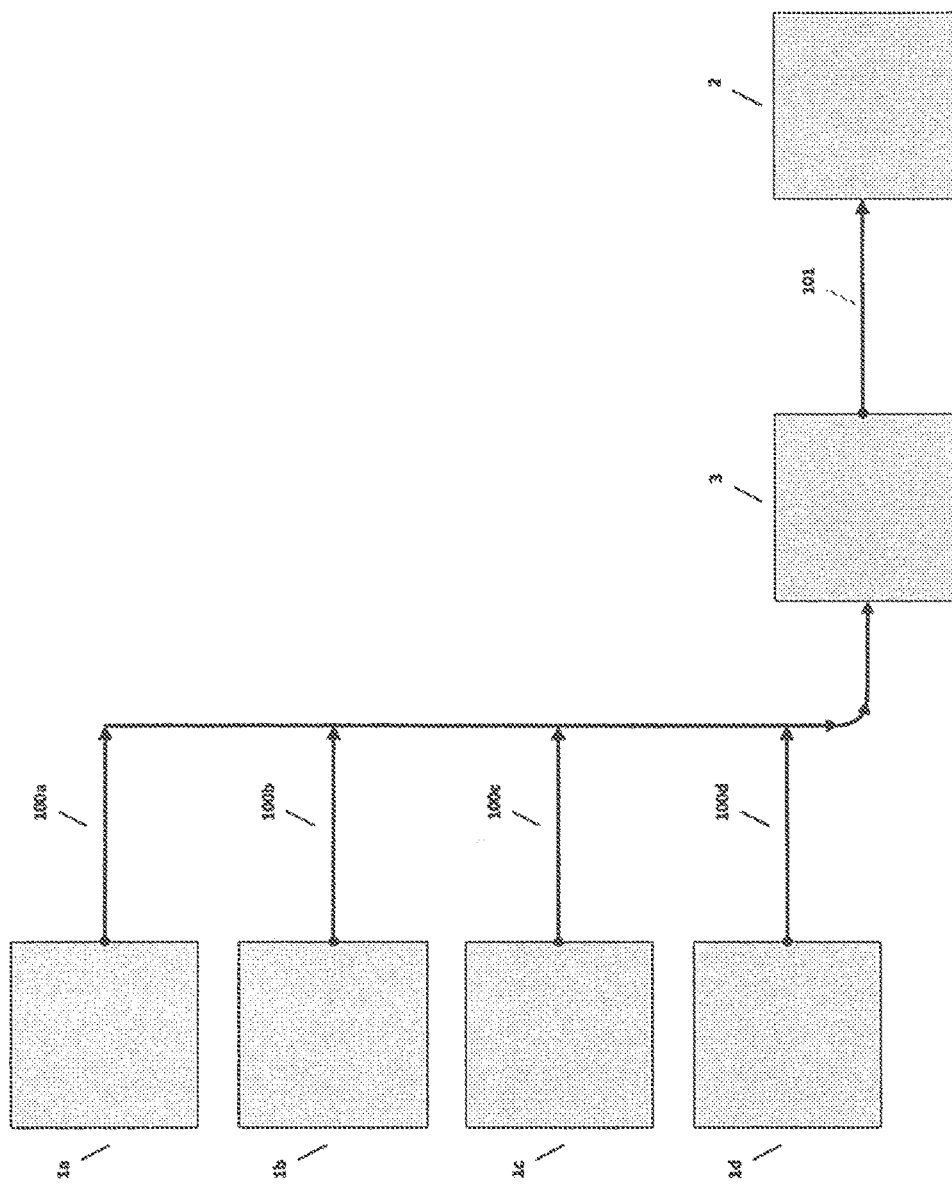
FIG. 3 shows a flow diagram for an iron oxide reducing system with a multiple first modules (1*a*, 1*b*, 1*c*, and 1*d*) which are configured to convey top gas (100*a*, 100*b*, 100*c*, and 100*d*) to an export gas storage module, 3, which in turn is configured to convey top gas to the second iron storage module, 2.

In various aspects, the invention relates to a system schematically shown in FIG. 3, wherein at least a portion of the top gas multiple instances of a first module, i.e. 1a, 1b, 1c, and 1d, are integrated together as an export top gas stream, 100, to a top gas holding module, 3, and top gas from the top gas holding module is conveyed, 101, to a second module, 2. Each of the first modules, i.e. 1a, 1b, 1c, and 1d, is capable of reducing iron oxide by a direct reduction process and comprises a first reducing gas inlet, a first reducing reactor, and a top gas outlet; wherein the first module, during operation, produces metallic iron and expels a top gas via the top gas outlet. The second module, 2, is capable of reducing iron oxide by a direct reduction process and comprises a second reducing gas inlet, a second reducing reactor, a reducing gas heater, and a steam boiler, wherein the second module, during operation, produces metallic iron; wherein the second module, during operation, produces metallic iron and operates at a pressure of at least about 5 bar, and wherein the second module is configured to receive the top gas from the first module as a heat-generation gas for the thermal equipment of the second module. The top gas holding module, 3, comprises a gas holder tank receiving the top gas flow path, a top gas flow path from the gas holder tank, a compressor operating on the top gas flow path from the gas holder tank, and a top gas flow from the top gas holder tank to a flare stack.

In one aspect, disclosed are iron oxide-reducing systems comprising: (a) a first module for reducing iron oxide by direct reduction process, the first module comprising a first reducing gas inlet, a first reducing reactor, and a top gas outlet; wherein the first module, during operation, produces metallic iron and expels a top gas stream via the top gas outlet; and (b) a second module for reducing iron oxide by direct reduction process, the second module comprising a second reducing gas inlet, a second reducing reactor, a reducing gas heater, and a steam boiler, wherein the second module, during operation, produces metallic iron; wherein the second module, during operation, produces metallic iron and operates at a pressure of at least about 5 bar, and wherein the second module is configured to receive the top gas stream from the first module as a heat-generation gas for the thermal equipment of the second module.

In a further aspect, the invention relates to iron oxide-reducing systems comprising: (a) a first module for reducing iron oxide by direct reduction process, the first module comprising a first reducing gas inlet, a first reducing reactor, and a top gas outlet, wherein the first module, during operation, produces metallic iron and expels a top gas stream via the top gas outlet; (b) a second module for reducing iron oxide by direct reduction process, the second module comprising a second reducing gas inlet, a second reducing reactor, a reducing gas heater, and a steam boiler; wherein the second module, during operation, produces metallic iron and operates at a pressure of at least about 5 bar; and wherein the second module is configured to receive the top gas stream from the top gas holding module as a heat-generation gas for the thermal equipment of the second module; and (c) a top gas holding module for storing the top gas from the first module, the top gas holding module comprising a gas holder tank receiving the top gas flow path, a top gas flow path from the gas holder tank, a compressor operating on the top gas flow path from the gas holder tank, and a top gas flow from the top gas holder tank to a flare stack; wherein the top gas holding module is configured to receive the top gas stream from the first module.

In a further aspect, the invention relates to an iron oxide-reducing system comprising: (a) a first module for reducing iron oxide by direct reduction process, the first module comprising a first reducing gas inlet, a first reducing reactor, and a top gas outlet; wherein the first module, during operation, produces metallic iron and expels a top gas via the top gas outlet; wherein the top gas outlet of the first module conveys the top gas to a top gas scrubber; wherein the top gas stream exiting the top gas scrubber is divided into multiple top gas flow paths; wherein one of the multiple top gas flow paths is an export top gas stream; and wherein the export top gas stream is directed to the top gas holding module; (b) a second module for reducing iron oxide by direct reduction process, the second module comprising a second reducing gas inlet, a second reducing reactor, a reducing gas heater, and a steam boiler; wherein the second module, during operation, produces metallic iron and operates at a pressure of at least about 5 bar; wherein the second module is configured to receive the top gas from the gas holding module as a heat-generation gas for the thermal equipment of the second module; wherein the burners of thermal equipment are double-tip burners; and wherein the double-tip burners are configured to use two fuel sources in parallel; wherein the two fuel sources for the double-tip burners are the top gas from the gas holding module and an external source of a second combustible gas; and wherein the proportion of the two fuel sources is configured to be greater than 0% to 75% of the top gas and less than 100% to 25% of the second combustible gas; and wherein the total of the two fuel sources is 100%; and (c) a top gas holding module for storing the top gas from the first module, the gas holding module comprising a gas holder tank receiving the top gas flow path, a top gas flow path from the gas holder tank, a compressor operating on the top gas flow path from the gas holder tank, and a top gas flow from the top gas holder tank to a flare stack; wherein the top gas holding module is configured to receive the top gas from the first module.

In a further aspect, the invention relates to an iron oxide-reducing system comprising: (a) a first module for reducing iron oxide by direct reduction process, the first module comprising a first reducing gas inlet, a first reducing reactor, and a top gas outlet; wherein the first module, during operation, produces metallic iron and expels a top gas via the top gas outlet; wherein the top gas outlet of the first module conveys the top gas to a top gas scrubber; wherein the top gas stream exiting the top gas scrubber is divided into multiple top gas flow paths; wherein one of the multiple top gas flow paths is an export top gas stream; wherein the export top gas stream is directed to the top gas holding module; and wherein export top gas stream to the gas holding module has a flow of about 7,500 to about 20,000 normal cubic meters per hour (NCMH); (b) a second module for reducing iron oxide by direct reduction process, the second module comprising a second reducing gas inlet, a second reducing reactor, a reducing gas heater, and a steam boiler; wherein the second module, during operation, produces metallic iron and operates at a pressure of at least about 5 bar; wherein the second module is configured to receive the top gas from the gas holding module as a heat-generation gas for the thermal equipment of the second module; wherein the thermal equipment is one or more reducing gas heater, one or more steam boiler, or a combination thereof; wherein the burners of thermal equipment are double-tip burners; and wherein the double-tip burners are configured to use two fuel sources in parallel; wherein the two fuel sources for the double-tip burners are the top gas from the gas holding module and an external source of a second combustible gas; wherein proportion of the two fuel sources is configured to be greater than 0% to 75% of the top gas and less than 100% to 25% of the second combustible gas; wherein the total of the two fuel sources is 100%; and wherein the second combustible gas is selected from natural gas, syngas, and methane; and (c) a top gas holding module for storing the top gas from the first module, the gas holding module comprising a gas holder tank receiving the top gas flow path, a top gas flow path from the gas holder tank, a compressor operating on the top gas flow path from the gas holder tank, and a top gas flow path from the top gas holder tank to a flare stack; wherein the top gas holding module is configured to receive the top gas from the first module; wherein the top gas holder tank has volume from about 200 cubic meters to about 1000 cubic meters; wherein the top gas flow path from the top gas holder tank is divided to a flow path to the second module and a recirculation flow path back to the gas holder tank; and wherein the recirculation flow path comprises a gas cooler.

In various aspects, the invention relates to relates to a process for producing direct reduced iron comprising producing a top gas with a first module for reducing iron oxide by a direct reduction process, conveying a portion of the top gas from the first module, receiving the top gas into a second module for producing direct reduced iron, and combusting top gas to generate heat in thermal equipment of the second module.

In a further aspect, the invention relates to a process reducing iron oxide, the process comprising the steps of: (a)

producing a top gas with a first module for reducing iron oxide by direct reduction process, the first module comprising a first reducing gas inlet, a first reducing reactor, and a top gas outlet; wherein the first module, during operation, produces metallic iron and expels the top gas via the top gas outlet; (b) conveying the top gas from the first module for reducing iron oxide; (c) receiving the top gas into a second module for reducing iron oxide by direct reduction process, the second module comprising a second reducing gas inlet, a second reducing reactor, a reducing gas heater, and a steam boiler; wherein the second module, during operation, produces metallic iron and operates at a pressure of at least about 5 bar; and (d) combusting the top gas to generate heat in the thermal equipment of the second module.

In a further aspect, the invention relates to a process for reducing iron oxide, the process comprising the steps of: (a) producing a top gas with a first module for reducing iron oxide by direct reduction process, the first module comprising a first reducing gas inlet, a first reducing reactor, and a top gas outlet; wherein the first module, during operation, produces metallic iron and expels the top gas via the top gas outlet; (b) conveying the top gas from the top gas outlet to a top gas scrubber; (c) dividing the top gas exiting the top gas scrubber into multiple top gas flow paths; (d) conveying one of the multiple top gas flow paths to a gas holder tank; (e) conveying top gas from the top gas holder tank to a knock-out drum; (0 conveying top gas from the knock-out drum to at least one particulate filter; (g) dividing the top gas into a recirculation flow path and a second module top gas flow path; (h) conveying the recirculation flow path to a gas cooler, and then conveying the cooled gas to the gas holder tank; (i) conveying the second module top gas flow path to the second module for reducing iron oxide; (j) receiving the top gas into a second module for reducing iron oxide by direct reduction process, the second module comprising a second reducing gas inlet, a second reducing reactor, a reducing gas heater, and a steam boiler; wherein the second module, during operation, produces metallic iron and operates at a pressure of at least about 5 bar, and (k) combusting the top gas to generate heat in the thermal equipment of the second module.

C. Direct Reduction of Iron

As discussed previously herein above, direct reduction ("DR") of iron, e.g. iron oxide or iron ore, generates metallic iron in solid form, also referred to as direct reduced iron ("DRI"), by removing oxygen using a reducing gas comprising hydrogen and carbon monoxide. In some cases, the reducing gas can be provided from the synthesis gas obtained from natural gas by steam methane reforming. Alternatively, the reducing gas can be produced in situ in the reducing reactor from supplied natural gas and oxygen. The reducing process can be illustrated by the following chemical reaction, where water and carbon dioxide are obtained as reaction byproducts:

$Fe_2O_3+H_2 \rightarrow 2Fe+3H_2O$ $Fe_2O_3+CO \rightarrow 2Fe+CO_2$

Iron obtained from a DR process can be cooled and carbonized, e.g. by counterflowing gases in the lower portion of a direct reduction reactor according to the following reaction:

$3Fe+CO+H_2 \rightarrow Fe_3C+H_2O$ $3Fe+CH_4 \rightarrow Fe_3C+2H_2$ $3Fe+2CO \rightarrow Fe_3C+CO_2$ By the foregoing chemical processes, products such as cold direct reduction iron, hot briquetted iron, and hot direct reduction iron can be manufactured.

In addition to the chemical reactions described herein above, methane reforming and water gas shift reactions can also occur in the gas phase based on the composition of the input reduction gas and operating temperatures in the reduction reaction vessel. These additional gas phase reactions include the following:

$CH_4+2H_2O \rightarrow CO_2+4H_2$ $CO_2+H_2 \rightarrow CO+H_2O$

Thus, the gas exiting a direct reduction reactor, i.e. off-gas or top gas, comprises both unreacted gases present in the input reducing gas mixture and the gaseous reaction products illustrated in the reactions above. In addition, the input reducing gas mixture can comprise additional components such nitrogen. The top gas is a complex gaseous mixture comprising nitrogen, methane, water vapor, hydrogen, carbon dioxide, and carbon monoxide. In various DR processes, the top gas can be cleaned by scrubbing and carbon dioxide removed. For example, the top gas, following scrubbing and carbon dioxide removal, can be recycled back into the reducing gas stream and utilized for further direct reduction of iron.

D. First Module Direct Reduction Process

In various aspects, the first module for reducing iron oxide by a direct reduction process comprises a first reducing gas inlet, a first reducing reactor, and a top gas outlet; wherein the first module, during operation, produces metallic iron and expels a top gas via the top gas outlet. An example of the first module for reducing iron by a direct reduction process is a production module or plant commonly using the Midrex® direct reduction process. In a further aspect, the first module for reducing iron oxide by direct reduction process utilizes a Midrex® direct reduction process and comprises a first reducing gas inlet, a first reducing reactor, and a top gas outlet, wherein the first module, during operation, produces metallic iron and expels a top gas via the top gas outlet.

Figure 4:
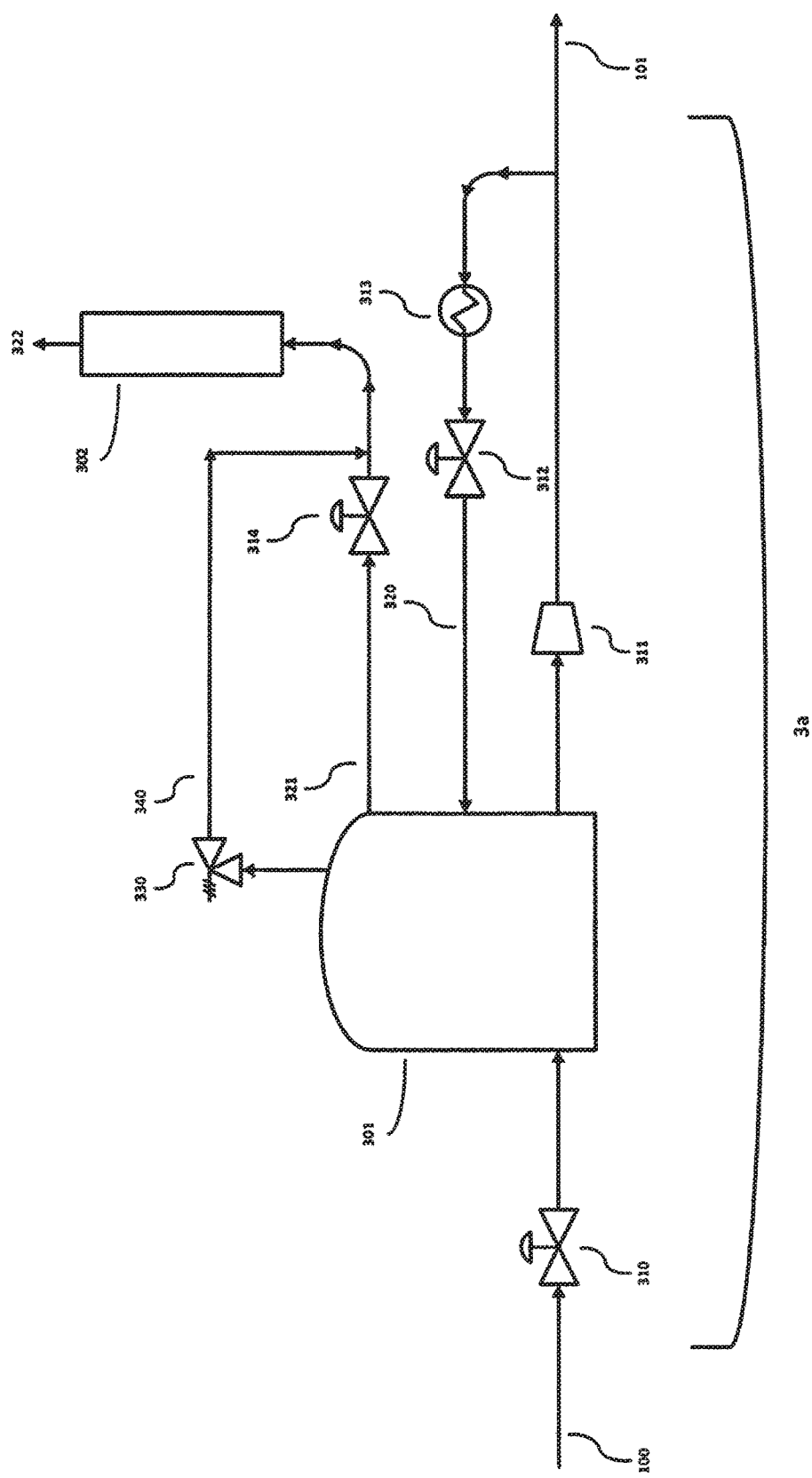
FIG. 4 shows a process diagram for an export gas storage module, 3*a*.
Figure 5:
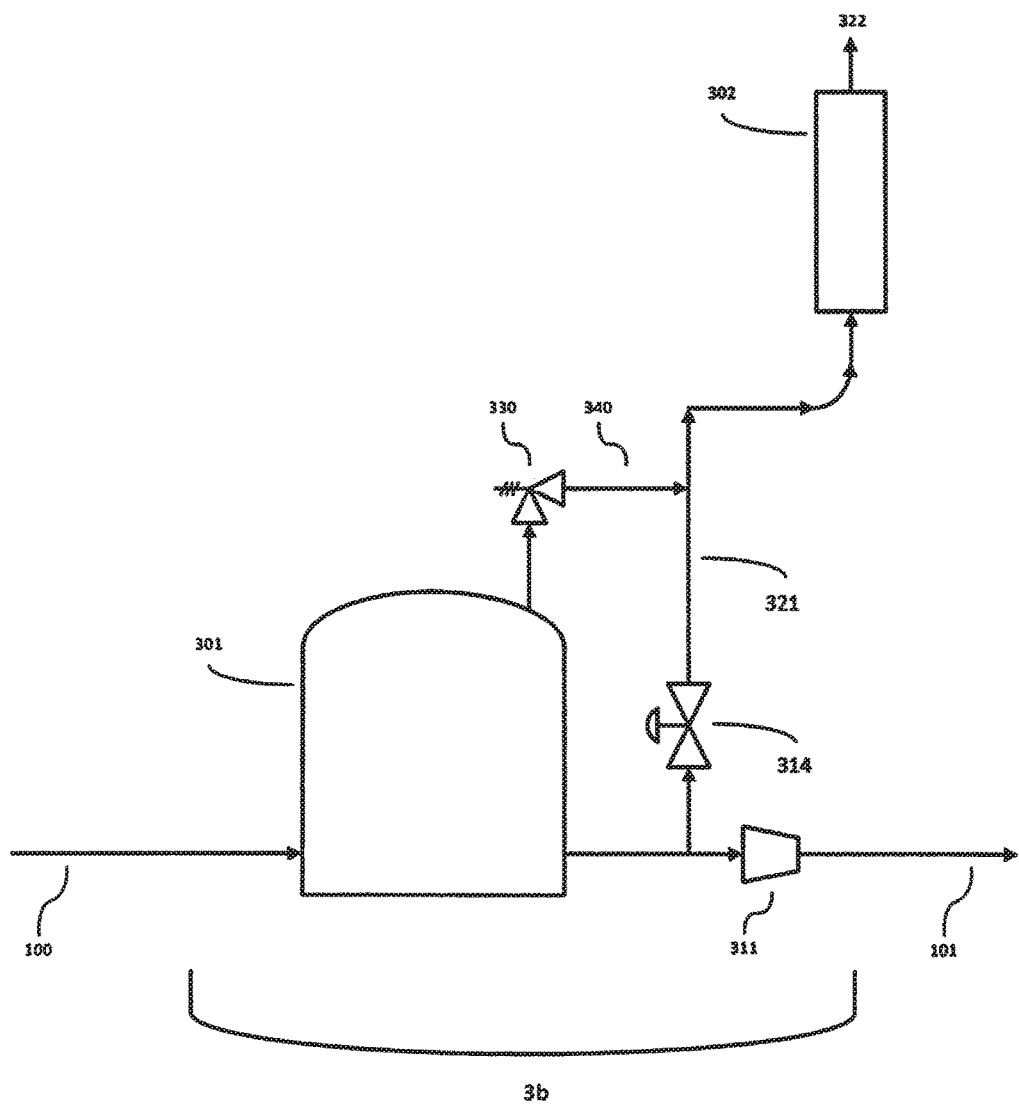
FIG. 5 shows a process diagram for an export gas storage module, 3*b*.

The first module direct reduction process is characterized by use of a low pressure reducing gas introduced to a moving bed shaft reactor where the reducing gas moves counter-current to the lump iron oxide (or alternatively, lump iron oxide pellets). Process diagrams showing examples of the first module direct reduction process are shown in FIGS. 4 and 5. Process diagrams showing examples of the first module direct process modified according the present invention are shown in the in FIGS. 8 and 9. In the first module direct reduction process, the reducing gas (from about 10 mol % to about 20 mol % CO; and from about 80 mol % to about 90 mol % $H_2$) is typically produced from natural gas using a $CO_2$ reforming process in combination with a catalyst. The first module direct reduction process is further characterized by a single reformer rather than a reformer/heater combination and by lack of a requirement to cool the reducing gas prior to introduction to the shaft reactor.

In various aspects, the first reducing reactor is a moving bed shaft reactor. Appropriate reactor designs are commercially available from Midrex Technologies, Inc. (Charlotte, N.C., US). In a further aspect, the first reducing reactor comprises a vertical cylindrical vessel containing an internal refractory insulation, wherein the iron oxide flows down by gravity and is contacted by an upward flowing reducing gas. In a still further aspect, the iron oxide is present as iron oxide pellets or lump iron ore.

In a further aspect, the first reducing gas inlet introduces to the first reducing reactor a reducing gas at a pressure from about 1 bar to about 1.5 bar at a temperature from about 800° C. to about 850° C. The reducing gas can generally be formed natural gas or other gaseous stream that can be reformed or cracked to produce $H_2$ or CO to be used in the reduction of the iron oxide. In general, high methane containing natural gas is the most common form of input gas for the formation of the reducing gas. The input gas may be a byproduct of other processes. In a still further aspect, the reducing gas mixture is formed from natural gas and water. In a yet further aspect, the reducing gas mixture comprises carbon monoxide and hydrogen.

In a further aspect, the top gas outlet of the first module conveys the top gas to a top gas scrubber. In a still further aspect, the top gas exiting the top gas scrubber is divided into multiple top gas flow paths. In a yet further aspect, one of the multiple top gas flow paths is an export top gas stream, wherein the export top gas stream is directed to the second module. In an even further aspect, the top gas exiting the top gas scrubber is divided into multiple top gas flow paths comprising a first module process gas stream, a first module fuel gas stream, and an export top gas stream. In a still further aspect, the export top gas stream has a flow of about 7,500 to about 20,000 normal cubic meters per hour (NCMH). In a yet further aspect, the export top gas stream has a flow of about 10,000 to about 15,000 normal cubic meters per hour (NCMH). In an even further aspect, the export top gas stream comprises a first top gas flow control valve; and wherein the first top gas flow control valve operates in parallel with a second top gas flow control valve operating on a top gas flow path conveyed to a first module flare stack.

In a further aspect, the top gas comprises about 30 mol % to about 50 mol % $H_2$; from about 10 mol % to about 30 mol % CO; from about 7.5 mol % to about 25 mol % $CO_2$; and from about 5 mol % to about 15 mol % $H_2O$; and wherein the percent value of all components does not exceed 100 mol %. In a still further aspect, the top gas comprises about 40 mol % to about 50 mol % $H_2$; from about 15 mol % to about 25 mol % CO; from about 10 mol % to about 25 mol % $CO_2$; and from about 7.5 mol % to about 12.5 mol % $H_2O$; and wherein the percent value of all components does not exceed 100 mol %.

In a further aspect, the export top gas stream comprises about 30 mol % to about 50 mol % $H_2$; from about 10 mol % to about 30 mol % CO; from about 7.5 mol % to about 25 mol % $CO_2$; and from about 5 mol % to about 15 mol % $H_2O$; and wherein the percent value of all components does not exceed 100 mol %. In a still further aspect, the export top gas stream comprises about 40 mol % to about 50 mol % $H_2$; from about 15 mol % to about 25 mol % CO; from about 10 mol % to about 25 mol % $CO_2$; and from about 7.5 mol % to about 12.5 mol % $H_2O$; and wherein the percent value of all components does not exceed 100 mol %.

In a further aspect, the top gas stream is conveyed to the top gas holding module. In a still further aspect, the top gas streams from multiple instances of the first module are conveyed to the top gas holding module. In a yet further aspect, the top gas streams from 1-6 instances of the first module are conveyed to the top gas holding module. In an even further aspect, the top gas streams from 1-4 instances of the first module are conveyed to the top gas holding module. In a still further aspect, the top gas streams from two instances of the first module are conveyed to the top gas holding module. In a yet further aspect, the top gas streams from three instances of the first module are conveyed to the top gas holding module. In an even further aspect, the top gas streams from four instances of the first module are conveyed to the top gas holding module.

In a further aspect, the export top gas stream is conveyed to the top gas holding module. In a still further aspect, the export top gas streams from multiple instances of the first module are conveyed to the top gas holding module. In a yet further aspect, the export top gas streams from 1-6 instances of the first module are conveyed to the top gas holding module. In an even further aspect, the export top gas streams from 1-5 instances of the first module are conveyed to the top gas holding module. In a still further aspect, the export top gas streams from 1-4 instances of the first module are conveyed to the top gas holding module. In a yet further aspect, the export top gas streams from 1-3 instances of the first module are conveyed to the top gas holding module. In an even further aspect, the export top gas streams from 1-2 instances of the first module are conveyed to the top gas holding module. In a still further aspect, the export top gas streams from a single instance of the first module is conveyed to the top gas holding module. In a yet further aspect, the export top gas streams from two instances of the first module are conveyed to the top gas holding module. In an even further aspect, the export top gas streams from three instances of the first module are conveyed to the top gas holding module. In a still further aspect, the export top gas streams from four instances of the first module are conveyed to the top gas holding module.

In a further aspect, the top gas stream is conveyed to the second module for reducing iron oxide by direct reduction process. In a still further aspect, the top gas streams from multiple instances of the first module are conveyed to the second module for reducing iron oxide by direct reduction process. In a yet further aspect, the top gas streams from 1-6 instances of the first module are conveyed to the second module for reducing iron oxide by direct reduction process. In an even further aspect, the top gas streams from 1-4 instances of the first module are conveyed to the second module for reducing iron oxide by direct reduction process. In a still further aspect, the top gas streams from two instances of the first module are conveyed to the second module for reducing iron oxide by direct reduction process. In a yet further aspect, the top gas streams from three instances of the first module are conveyed to the second module for reducing iron oxide by direct reduction process. In an even further aspect, the top gas streams from four instances of the first module are conveyed to the second module for reducing iron oxide by direct reduction process.

In a further aspect, the export top gas stream is conveyed to the second module for reducing iron oxide by direct reduction process. In a still further aspect, the export top gas streams from multiple instances of the first module are conveyed to the second module for reducing iron oxide by direct reduction process. In a yet further aspect, the export top gas streams from 1-6 instances of the first module are conveyed to the second module for reducing iron oxide by direct reduction process. In an even further aspect, the export top gas streams from 1-4 instances of the first module are conveyed to the second module for reducing iron oxide by direct reduction process. In a still further aspect, the export top gas streams from two instances of the first module are conveyed to the second module for reducing iron oxide by direct reduction process. In a yet further aspect, the export top gas streams from three instances of the first module are conveyed to the second module for reducing iron oxide by direct reduction process. In an even further aspect, the export top gas streams from four instances of the first module are conveyed to the second module for reducing iron oxide by direct reduction process.

E. Second Module Direct Reduction Process

In various aspects, the second module for reducing iron oxide by a direct reduction process comprises a second reducing gas inlet, a second reducing reactor, a reducing gas heater, and a steam boiler; wherein the second module, during operation, produces metallic iron; and wherein the second module, during operation, produces metallic iron and operates at a pressure of at least about 5 bar. An example of the second module for reducing iron by a direct reduction process is a production module or plant commonly using the HYL® direct reduction process. In a further aspect, the second module for reducing iron oxide by direct reduction process utilizes a HYL® direct reduction process and a second reducing gas inlet, a second reducing reactor, a reducing gas heater, and a steam boiler, wherein the second module, during operation, produces metallic iron; and wherein the second module, during operation, produces metallic iron and operates at a pressure of at least about 5 bar.

Figure 6:
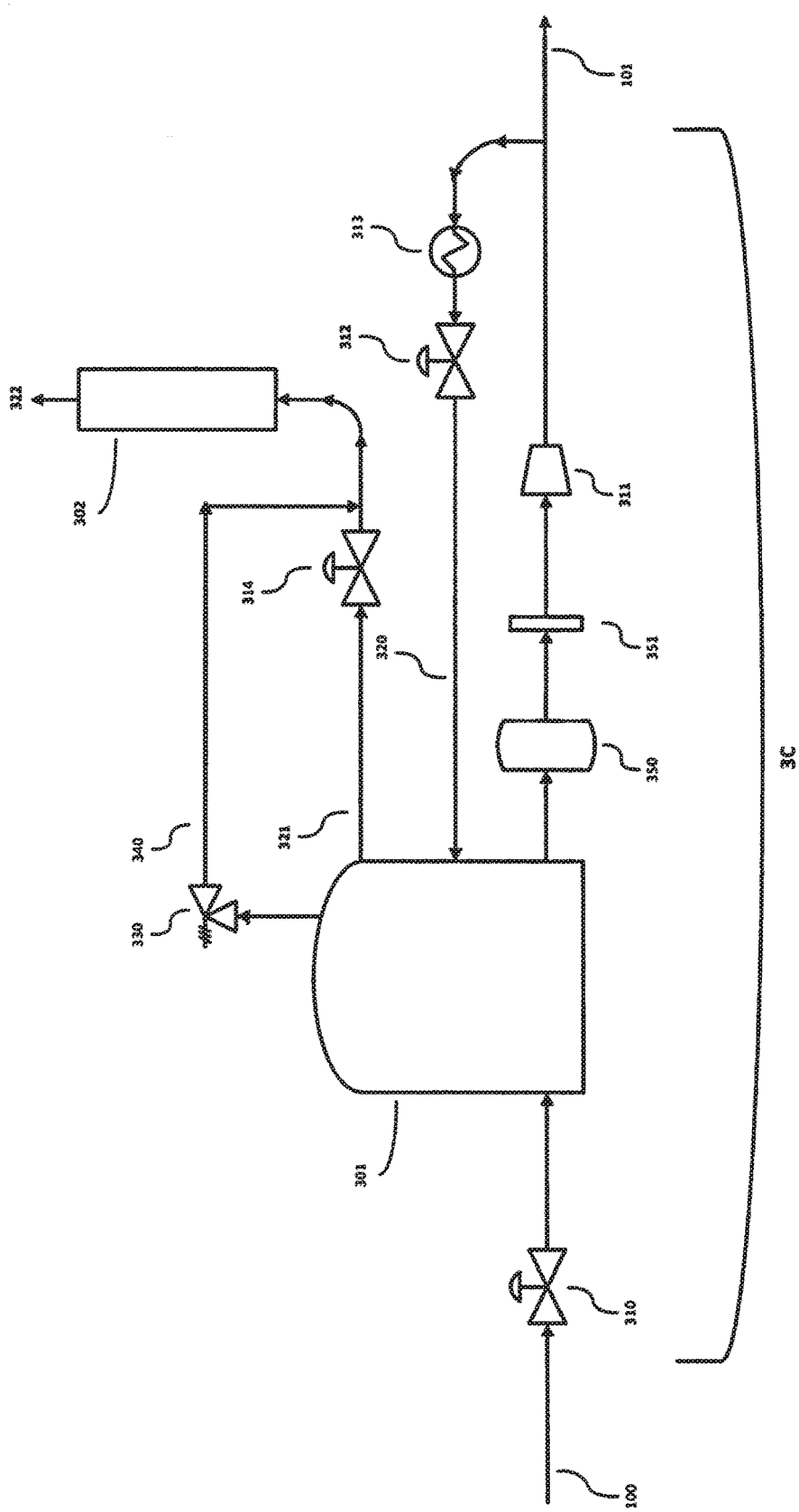
FIG. 6 shows a process diagram for an export gas storage module, 3*c*.
Figure 10:
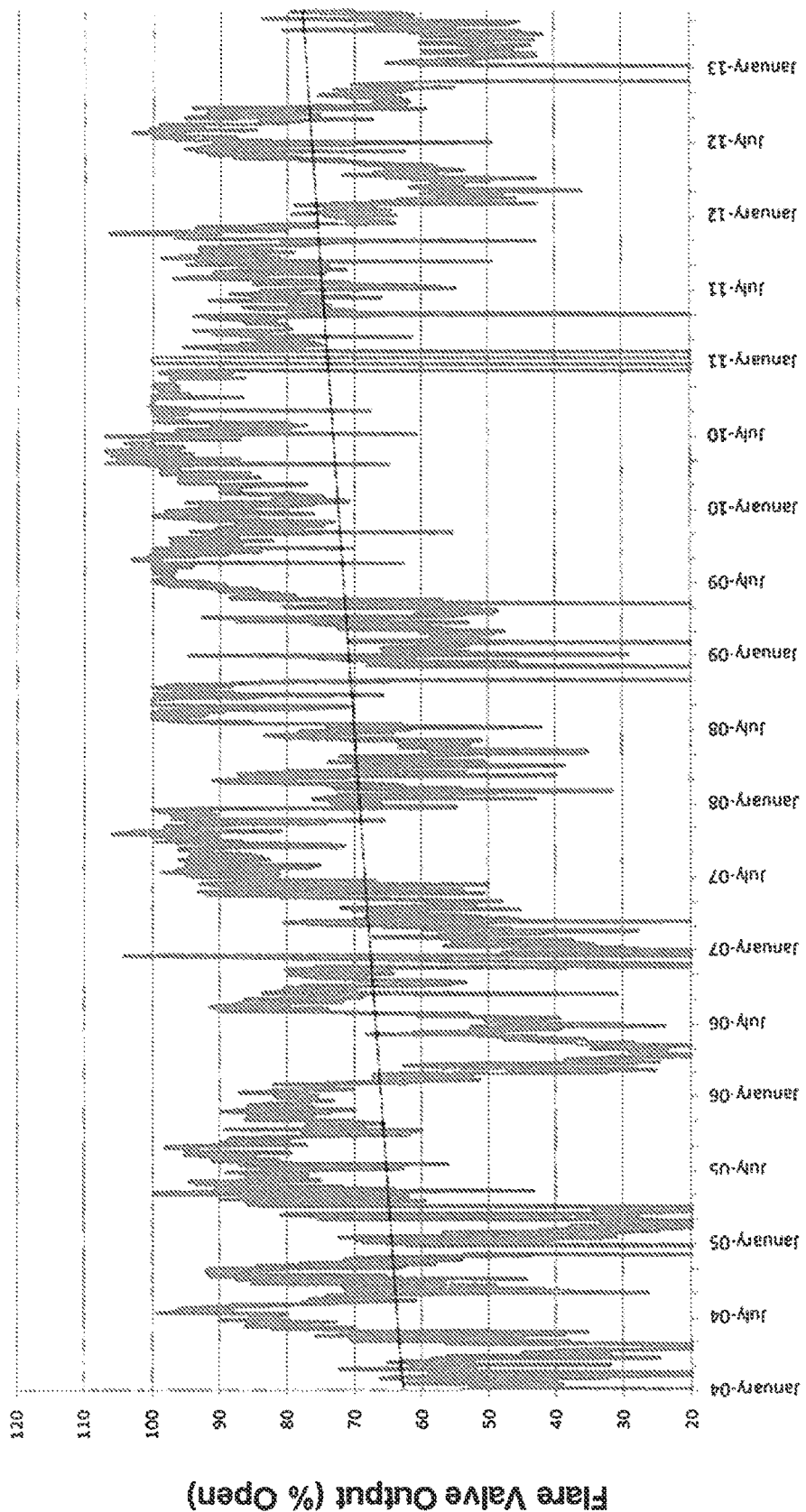
FIG. 10 shows representative data for flare valve output (% open) in a representative first module. The heavy grey line shows the percent open time for the flare valve over the time period indicated on the x-axis, and the lighter black line shows the best linear fit to the data.

The second module direct reduction process is characterized by use of a high pressure reducing gas introduced to a moving bed shaft reactor where the reducing gas moves counter-current to the lump iron oxide (or alternatively, lump iron oxide pellets). Process diagrams showing examples of the first module direct reduction process are shown in FIGS. 6 and 7. Process diagrams showing examples of the first module direct process modified according the present invention are shown in the in FIGS. 10 and 11. In the second module direct reduction process, the reducing gas is generated by self-reforming in the second reduction reactor, with make-up gas—typically natural gas—being provided to the reducing gas circuit and injecting oxygen at the inlet of the second reducing reactor. The second module direct reduction process is further characterized by a reducing gas heater. The second module direct reduction process can optionally comprise a steam methane reforming unit.

In various aspects, the second reducing reactor is a moving bed shaft reactor. Appropriate reactor designs are commercially available from Tenova HYL (Coraopolis, Pa., US). In a further aspect, the second reducing reactor comprises a vertical cylindrical vessel, wherein iron oxide is introduced to the second reducing reactor via a sealing mechanism that is based upon a pressure lock system. In a still further aspect, once the iron oxide is introduced in the second reducing reactor, it flows down by gravity and is contacted by an upward flowing reducing gas. In a still further aspect, the iron oxide is present as iron oxide pellets, lump iron ore, or mixture thereof.

In a further aspect, the second reducing gas inlet introduces to the second reducing reactor a reducing gas at a pressure from about 5 bar to about 6.5 bar at a temperature from about 900° C. to about 960° C. Optionally, the reducing gas temperature can be further increased to from about 1000° C. to about 1020° C. by partial combustion with oxygen prior to introduction to the second reducing reactor.

The reducing gas utilized in the second reducing reactor is typically generated by self-reforming in the second reducing reactor from natural gas and oxygen. As needed, additional natural gas is provided to the reducing gas circuit as make-up gas. In the second reducing reactor, partial oxidation of the natural gas with oxygen generates reducing gases ($H_2$ and CO) in situ, and also increases the operating temperature within the second reducing reactor. The reducing gas mixture undergoes further cracking and reforming reactions within the second reducing reactor due to the catalytic effect of the metallic iron present. The partial oxidation and reforming reactions include the reactions represented by the following chemical equations:

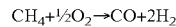
$$CH_4 + \tfrac{1}{2}O_2 \rightarrow CO + 2H_2$$

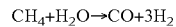
$$CH_4 + H_2O \rightarrow CO + 3H_2$$

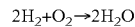
$$2H_2 + O_2 \rightarrow 2H_2O$$

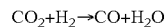
$$CO_2 + H_2 \rightarrow CO + H_2O$$

In a further aspect, the thermal equipment of the second module is selected from a reducing gas heater and a steam boiler. In a still further aspect, the thermal equipment of the second module is a reducing gas heater. In a yet further aspect, the thermal equipment of the second module is a steam boiler. In an even further aspect, the burners of thermal equipment are double-tip burners; and wherein the double-tip burners are configured to use two fuel sources in parallel.

In a further aspect, the two fuel sources are the top gas from the first module and an external source of a second combustible gas. In a yet further aspect, the minimum level of the second combustible gas utilized in the double-tip burner is 25%. In an even further aspect, the maximum level of the top gas from the first module utilized in the double-tip burner is 75%. In a still further aspect, the proportion of the two fuel sources used by the thermal equipment of the second module is greater than 0% to 75% of the top gas and less than 100% to 25% of the second combustible gas; and the total of the two fuel sources is 100%. In a yet further aspect, the second combustible gas is natural gas. In an even further aspect, the second combustible gas is methane-rich natural gas. In a still further aspect, the second combustible gas is syngas. In a yet further aspect, the second combustible gas is methane.

In a further aspect, the second module is configured to receive the top gas stream from multiple instances of the first module. In a still further aspect, the second module is configured to receive the top gas stream from 1-6 instances of the first module. In a yet further aspect, the second module is configured to receive the top gas stream from 1-4 instances of the first module. In an even further aspect, the second module is configured to receive the top gas stream from two instances of the first module. In a still further aspect, the second module is configured to receive the top gas stream from three instances of the first module. In a yet further aspect, the second module is configured to receive the top gas stream from four instances of the first module.

In a further aspect, the second module is configured to receive the export top gas stream from multiple instances of the first module. In a still further aspect, the second module is configured to receive the export top gas stream from 1-6 instances of the first module. In a yet further aspect, the second module is configured to receive the export top gas stream from 1-4 instances of the first module. In an even further aspect, the second module is configured to receive the export top gas stream from two instances of the first module. In a still further aspect, the second module is configured to receive the export top gas stream from three instances of the first module. In a yet further aspect, the second module is configured to receive the export top gas stream from four instances of the first module.

F. Top Gas Holding Module

In various aspects, the present invention pertains to a top gas holding module for storing the top gas from the first module, the top gas holding module comprising a gas holder tank receiving the top gas flow path, a top gas flow path from the gas holder tank, a compressor operating on the top gas flow path from the gas holder tank, and a top gas flow from the top gas holder tank to a flare stack; and wherein the top gas holding module is configured to receive the top gas from the first module.

In various aspects, an example of top gas holding module, 3a, is shown in the process scheme of FIG. 4. As shown, an export top gas stream, 100, is conveyed from one or more first modules for reducing iron oxide by direct reduction process through a flow control valve, 310, to a gas holder tank, 301. Depending upon the number of first module units providing the export top gas stream, the pipe transporting the export top gas stream is a header piper from about 18 inch to about 24 inch diameter. For example, the combined export top gas flow from four first module units with a combined maximum export gas flow of about 45,000 NCMH, would require about a 24 inch diameter header pipe. In such a configuration, the export top gas stream from each first module would be individually transported and merged into a single header pipe.

Export top gas is conveyed from the top gas holder tank, 301, to an export gas compressor, 311, and then to the second module as export top gas stream, 101. In a further aspect, the export gas compressor is a screw compressor. In case of any reduction of top gas flow consumption in the thermal equipment of the second module, a portion of the export top gas stream is recirculated back, 320, to the top gas holder tank via an export gas aftercooler, 313, and a flow control valve, 312. Excess top gas in the top gas holder tank can be conveyed as an excess export top gas stream, 321, via a flow control valve, 314, to a flare stack, 302, where excess export top gas is flared, 322. As shown in FIG. 4, top gas holding module, 3a, comprises a pressure relief valve, 330, through an overpressure gas stream, 340, is conveyed to the flare stack, 302. In a further aspect, top gas holding module, 3a, can omit the pressure relief valve and overpressure gas stream, and in such cases, the flow control valve, 314, becomes a pressure control valve.

In various aspects, an example of top gas holding module, 3b, is shown in the process scheme of FIG. 5. As shown, an export top gas stream, 100, is conveyed from one or more first modules for reducing iron oxide by direct reduction process to a gas holder tank, 301. Export top gas is conveyed from the gas holder tank, 301, and the export gas stream is divided as shown with one stream being conveyed to an export top gas compressor, 311, and then to the second module as export top gas stream, 101. In case of any reduction of top gas flow consumption in the thermal equipment of the second module, a portion of the export top gas stream from the gas holder tank, 301, is directed through a flow control valve, 314, as an excess export top gas stream to a flare stack, 302, where excess export top gas is flared, 322. As shown in FIG. 5, top gas holding module, 3b, comprises a pressure relief valve, 330, through an overpressure gas stream, 340, is conveyed to the flare stack, 302. In a further aspect, top gas holding module, 3a, can omit the pressure relief valve and overpressure gas stream, and in such cases, the flow control valve, 314, becomes a pressure control valve.

In various aspects, an example of top gas holding module, 3c, is shown in the process scheme of FIG. 6. As shown, an export top gas stream, 100, is conveyed from one or more first modules for reducing iron oxide by direct reduction process through a flow control valve, 310, to a gas holder tank, 301. In a further aspect, the export top gas is conveyed from the top gas holder tank, 301, to a knockout drum, 350, to remove water from the export top gas stream. In a still further aspect, following passaging through the knock-out drum, the export top gas stream is conveyed to one or more filters, 351, to remove particulate matter from the export top gas stream. The export top gas is conveyed to an export gas compressor, 311, and then to the second module as export top gas stream, 101. In a further aspect, the export gas compressor is a screw compressor. In case of any reduction of top gas flow consumption in the thermal equipment of the second module, a portion of the export top gas stream is recirculated back, 320, to the top gas holder tank via an export gas aftercooler, 313, and a flow control valve, 312. Excess top gas in the top gas holder tank can be conveyed as an excess export top gas stream, 321, via a flow control valve, 314, to a flare stack, 302, where excess export top gas is flared, 322. As shown in FIG. 4, top gas holding module, 3a, comprises a pressure relief valve, 330, through an overpressure gas stream, 340, is conveyed to the flare stack, 302. In a further aspect, top gas holding module, 3a, can omit the pressure relief valve and overpressure gas stream, and in such cases, the flow control valve, 314, becomes a pressure control valve.

The gas holder tank, 301, can be of various types as is suitable to the terrain, environment, and other constraints of a specific plant site. Various types of suitable gas holder tanks are shown FIG. 7, including (A) spherical gas storage tank, 301a; (B) piston type gas holder tank, 301b; (C) an alternative piston type gas holder tank, 301c; and (D) floating roof type gas holder tank, 301d. In various aspects, the gas holder tank, 301, including the various examples, 301a, 301b, 301c, and 301d, have a maximum design pressure from about 0.5 barg to about 1.0 barg. In a further aspect, the gas holder tank, 301, including the various examples, 301a, 301b, 301c, and 301d, have a maximum design pressure from about 0.5 barg to about 0.7 barg.

The spherical gas storage tank comprises the storage vessel itself, 301a, which can be constructed from mild steel, stainless steel, carbon steel, aluminium, and specialized types of plastics. The spherical gas storage tank optionally further comprises a pressure relief valve, 330, with the overpressure gas being conveyed as an overpressure gas stream, 340, to flare stack. In various aspects, the flow of export top gas into and out of the top gas holder tank such that a pressure relief is not required. The spherical gas storage tank comprises flow control valves, 401 and 402, which operate, respectively, on the gas supply stream, 500, and gas demand stream, 501, to control flow into and out of the gas holder tank. In various aspects, the gas supply to the gas holder tank, 301a, is the export top gas stream from the first module, and the gas demand is the export top gas that is conveyed, in part, to the second module.

There are various types of piston gas, two types of which are shown in FIGS. 7B and 7C. Referring now to the piston type gas holder tank shown in FIG. 7B, the piston type gas holder tank comprises the storage vessel itself, 301b, which can be constructed from materials such as mild steel, stainless steel, carbon steel, aluminium, and specialized types of plastics. The piston type gas holder tank, 301b, further comprises a vent, 331, and a seal, 403, placed between the piston, 600, and the vessel wall, wherein the piston is counter-weighted with weights, 404. The piston type gas holder tank, 301b, comprises flow control valves, 401 and 402, which operate, respectively, on the gas supply stream, 500, and gas demand stream, 501, to control flow into and out of the gas holder tank. In various aspects, the gas supply to the gas holder tank, 301b, is the export top gas stream from the first module, and the gas demand is the export top gas that is conveyed, in part, to the second module.

Referring now to the piston type gas holder tank shown in FIG. 7C, the piston type gas holder tank comprises the storage vessel itself, 301c, which can be constructed from materials such as mild steel, stainless steel, carbon steel, aluminium, and specialized types of plastics. The piston type gas holder tank, 301c, further comprises a vent, 331, and a flexible diaphragm membrane, 405, which is located between the piston, 600, and the vessel wall. The flexible diaphragm membrane can be constructed from various suitable plastic or polymeric materials, e.g. neoprene. Attached to the piston is a guide rod, 406. The piston type gas holder tank, 301c, comprises flow control valves, 401 and 402, which operate, respectively, on the gas supply stream, 500, and gas demand stream, 501, to control flow into and out of the gas holder tank. In various aspects, the gas supply to the gas holder tank, 301c, is the export top gas stream from the first module, and the gas demand is the export top gas that is conveyed, in part, to the second module.

The floating roof type gas holder tank comprises the storage vessel itself, 301d, which can be constructed from mild steel, stainless steel, carbon steel, aluminium, and specialized types of plastics. The floating roof type gas holder tank further comprises a fluid seal, 407, which is typically a water seal pot which allows the tank sections to "telescope" in the vertical direction as the contained gas quantity changes. The seals can also be various types of oil. In either case, whether the seal pot contains water or a type of oil, they are fitted between the telescoping sections with sufficient head pressure to prevent the contained gas from escaping through the seal pots. The floating roof type gas holder tank comprises flow control valves, 401 and 402, which operate, respectively, on the gas supply stream, 500, and gas demand stream, 501, to control flow into and out of the gas holder tank. In various aspects, the gas supply to the gas holder tank, 301d, is the export top gas stream from the first module, and the gas demand is the export top gas that is conveyed, in part, to the second module.

In one aspect, the top gas holding module comprises a gas holder tank receiving the top gas flow path, a top gas flow path from the gas holder tank, a compressor operating on the top gas flow path from the gas holder tank, and a top gas flow from the top gas holder tank to a flare stack. In a further aspect, the top gas holding module further comprises a knock-out drum operating on the top gas flow path from the gas holder tank, wherein the knock-out drum removes water from the top gas; and one or more filters operating on the top gas flow path from the gas holder tank, wherein the filters remove particulates from the top gas. In a still further aspect, the top gas holding module comprises a top gas flow path from the top gas holder tank to the knock-out drum, a top gas flow path from the knock-out drum to the one or more filters, and a top gas flow path from the one or more filters to the compressor.

In a further aspect, the top gas holding module further comprises a means for dividing the top gas flow path from the top gas holder tank to a flow path to the second module and a recirculation flow path back to the gas holder tank. In a still further aspect, the recirculation flow path further comprises a gas cooler.

In a further aspect, the top gas holder tank has a volume from about 200 cubic meters to about 1000 cubic meters. In a still further aspect, the top gas holder tank has a volume from about 400 cubic meters to about 800 cubic meters. In a yet further aspect, the top gas holder tank has a volume from about 600 cubic meters to about 800 cubic meters. In an even further aspect, the top gas holder tank is a spherical gas holder tank. In a still further aspect, the top gas holder tank is a piston-type gas holder tank comprising a counter-weighted internal disc and elastic diaphragm; and wherein the counter-weighted internal disc moves in the vertical axis of the gas holder tank.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in degrees Celsius (° C.) or is at ambient temperature, and pressure is at or near atmospheric.

Figure 8:
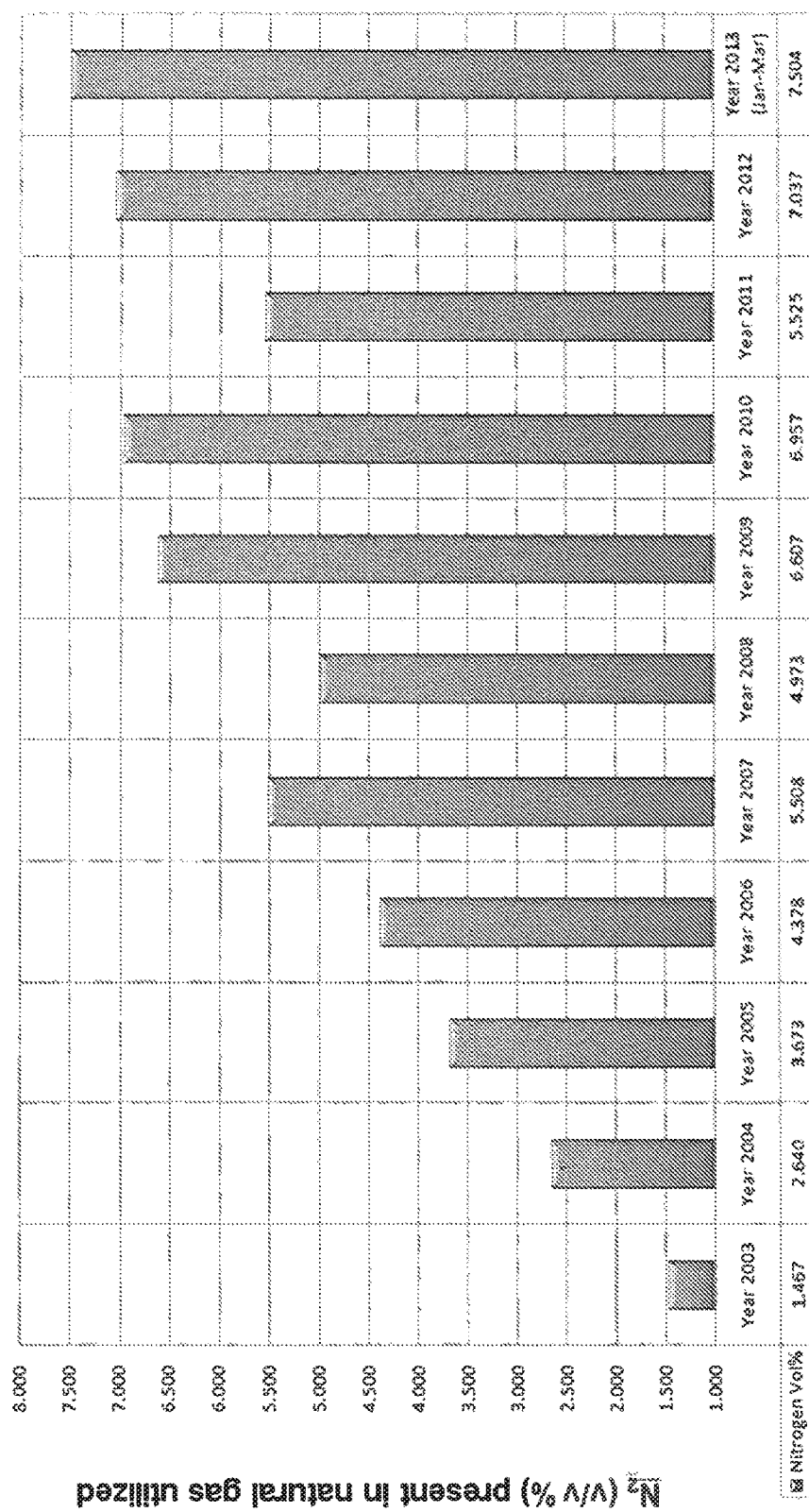
FIG. 8 shows representative data for the nitrogen content (v/v %) of natural gas used in a representative first module. The heavy grey line shows the nitrogen content (v/v %) of natural gas used over the time period indicated on the x-axis, and the lighter black line shows the best linear fit to the data.
Figure 9:
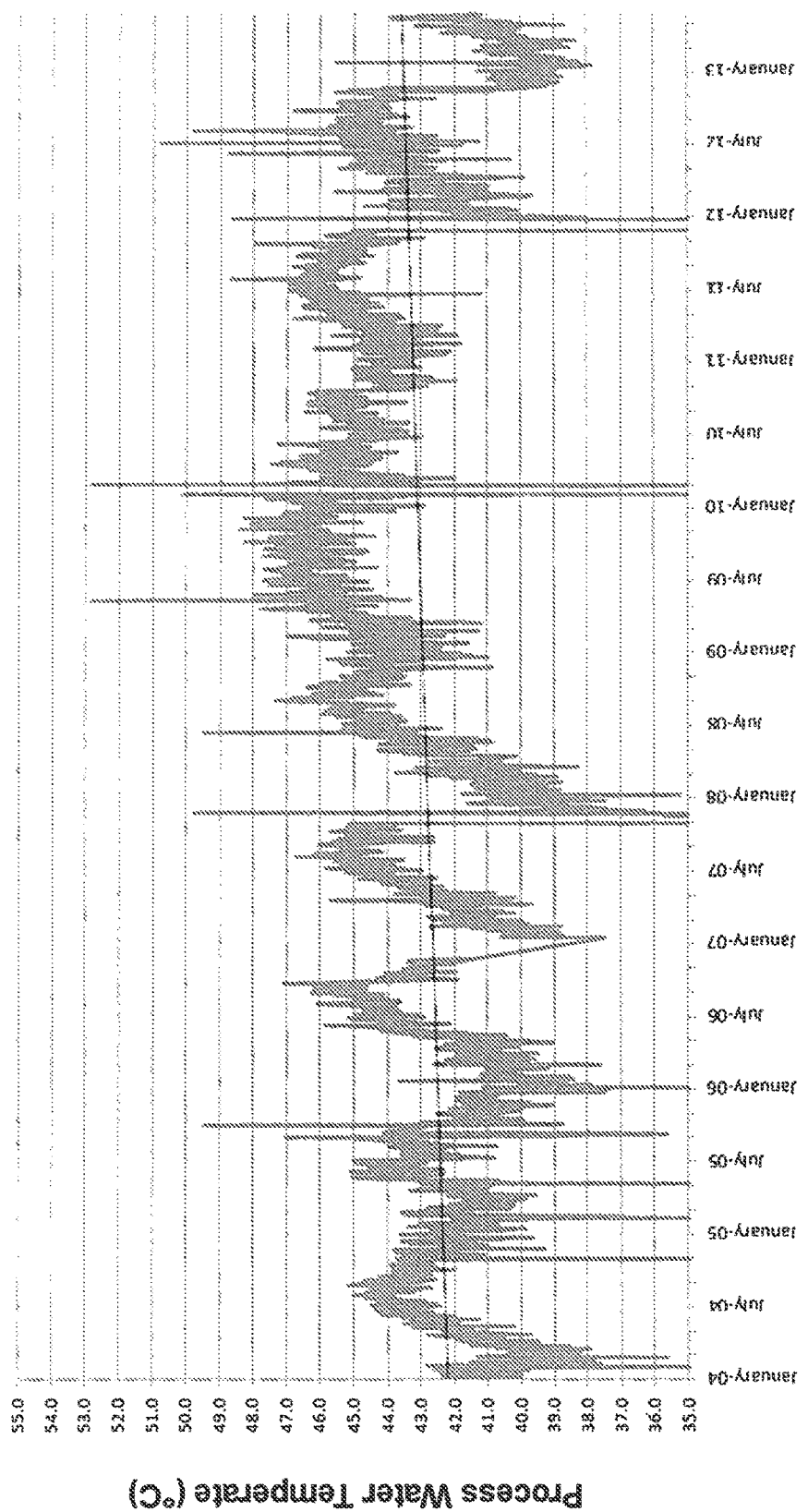
FIG. 9 shows representative data for process water temperature utilized in a representative first module. The heavy grey line shows the process water temperature over the time period indicated on the x-axis, and the lighter black line shows the best linear fit to the data.

In a typical DRI production facility comprising a first module for reducing iron as described herein, e.g. a DRI production facility, the flaring of excess top gas can vary significantly due to a variety of factors. For example, pushing the production capacity to a sustained high level of production, the temperature of process cooling water used in the facility, and the composition of natural gas inputs used in the facility. For example, nitrogen can be used to enhance recovery of natural gas from natural gas fields. As shown in FIG. 8, the presence of nitrogen (v/v %) has been steadily increasing in the source natural gas used at the production facility (Hadeed, Saudi Arabia), increasing from less than 1.5 v/v % to nearly 7.5 v/v % in a ten year period (see FIG. 8). Concomitant with the increasing levels of nitrogen in the natural gas being sourced to the production facility, the temperature of the process water, locally obtained seawater, has been steadily increase over nearly the same time period (see FIG. 9, linear fit line to data) with approximately a 1.5° C. increase in the typical temperature. The resultant impact on the flaring of excess top gas can be seen in FIG. 10, which shows data for flare valve output in terms of percent open time. The data show that over nearly a ten year period, the flare valve output has increased from about 63% to about 78%.

The present invention provides a solution to the increased flaring of top gas, i.e. use as a fuel gas input into a second module for direct reduction of iron, e.g. a process facility. The unique confluence of several factors, including increasing nitrogen content of natural gas inputs and the increasing temperature of process water, has led to a solution to optimally use the top gas productively rather than flaring.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An iron oxide-reducing system, the system comprising:
a first module for reducing iron oxide by direct reduction process, the first module comprising a first reducing gas inlet, a first reducing reactor, and a top gas outlet;
wherein during operation the first module produces metallic iron and expels a top gas stream via the top gas outlet;
an export gas storage module which is configured to receive top gas from the first module; and
a second module for reducing iron oxide by direct reduction process, the second module comprising a second reducing gas inlet, a second reducing reactor, a reducing gas heater, and a steam boiler, wherein the second module, during operation, produces metallic iron;
wherein the second iron reducing module is configured to receive top gas from the export gas storage module;
wherein the second module comprises a process gas heating unit and thermal equipment; and.

2. The system of claim 1, wherein the top gas stream exiting the top gas scrubber is divided into multiple top gas flow paths.

3. The system of claim 2, wherein one of the multiple top gas flow paths is an export top gas stream, wherein the export top gas stream is directed to the second module.

4. The system of claim 3, wherein the export top gas stream comprises a first top gas flow control valve; and wherein the first top gas flow control valve operates in parallel with a second top gas flow control valve operating on a top gas flow path conveyed to a first module flare stack.

5. The system of claim 3, wherein the export top gas stream is conveyed to a top gas holding module.

6. An iron oxide-reducing system comprising the steps of:
(a) a first module for reducing iron oxide by direct reduction process, the first module comprising a first reducing gas inlet, a first reducing reactor, and a top gas outlet;
wherein during operation the first module produces metallic iron and expels a top gas stream via the top gas outlet; and
(b) a second module for reducing iron oxide by direct reduction process, the second module comprising a second reducing gas inlet, a second reducing reactor, a reducing gas heater, and a steam boiler, wherein the second module, during operation, produces metallic iron;
wherein the second module comprises a process gas heating unit and thermal equipment; and
wherein the second module is configured to receive the top gas stream from the first module as a heat-generation gas for thermal equipment of the second module; and
wherein the thermal equipment of the second module comprises a reducing gas heater, wherein the burners of thermal equipment are double-tip burners; and wherein the double-tip burners are configured to use two fuel sources in parallel.

7. The system of claim 6, wherein the two fuel sources are the top gas from the first module and an external source of a second combustible gas.

8. An iron oxide-reducing system, the system comprising:
(a) a first module for reducing iron oxide by direct reduction process, the first module comprising a first reducing gas inlet, a first reducing reactor, and a top gas outlet;
wherein the first module, during operation, produces metallic iron and expels a top gas stream via the top gas outlet;
(b) a second module for reducing iron oxide by direct reduction process, the second module comprising a second reducing gas inlet, a second reducing reactor, a process gas heating unit, thermal equipment and a steam boiler; and
(c) a top gas holding module for storing the top gas from the first module, the top gas holding module comprising a gas holder tank receiving the top gas flow path, a top gas flow path from the gas holder tank, a compressor operating on the top gas flow path from the gas holder tank, and a top gas flow from the top gas holder tank to a flare stack;
wherein the top gas holding module is configured to receive the top gas stream from the first module; and
wherein the second module is configured to receive the top gas stream from the gas holding module as a heat-generation gas for the thermal equipment; and
wherein the thermal equipment of the second module comprises a reducing gas heater, wherein the burners of thermal equipment are double-tip burners; and wherein the double-tip burners are configured to use two fuel sources in parallel.

9. The system of claim 8, wherein the top gas outlet of the first module conveys the top gas to a top gas scrubber.

10. The system of claim 9, wherein the top gas stream exiting the top gas scrubber is divided into multiple top gas flow paths.

11. The system of claim 10, wherein one of the multiple top gas flow paths is an export top gas stream, wherein the export top gas stream is directed to the top gas holding module.

12. The system of claim 8, wherein the two fuel sources are the top gas from the first module and an external source of a second combustible gas.

13. A process for reducing iron oxide, the process consisting of the steps of:
(a) producing a top gas with a first module for reducing iron oxide by direct reduction process, the first module comprising a first reducing gas inlet, a first reducing reactor, and a top gas outlet;
wherein the first module, during operation, produces metallic iron and expels the top gas via the top gas outlet;
(b) conveying the top gas from the first module for reducing iron oxide;
(c) receiving the top gas into a second module for reducing iron oxide by direct reduction process, the second module comprising a second reducing gas inlet, a second reducing reactor, a reducing gas heater, and a steam boiler;
wherein the second module, during operation, produces metallic iron; and
wherein the second module comprises a process gas heating unit and thermal equipment;
(d) combusting the top gas to generate heat in the thermal equipment of the second module;
wherein the thermal equipment of the second module comprises a reducing gas heater.

14. The process of claim 13, wherein the top gas stream is conveyed to a top gas holder tank.

15. The process of claim 14, wherein the top gas streams from a single instance of the first module is conveyed to a top gas holding module.

\* \* \* \* \*

UNITED STATES PATENT AND TRADEMARK OFFICE
CERTIFICATE OF CORRECTION

PATENT NO. : 10,260,117 B2
APPLICATION NO. : 14/905680
DATED : April 16, 2019
INVENTOR(S) : Ahmed H. Al-Nazr Page 1 of 1

It is certified that error appears in the above-identified patent and that said Letters Patent is hereby corrected as shown below:

In the Claims

In Column 19, Claim 1, Line 26, please delete "; and"

Signed and Sealed this
Twenty-first Day of January, 2020

Andrei Iancu
*Director of the United States Patent and Trademark Office*